O. M. NACKER.
VALVE OPERATING MECHANISM.
APPLICATION FILED JUNE 4, 1917.
1,265,103.
Patented May 7, 1918.
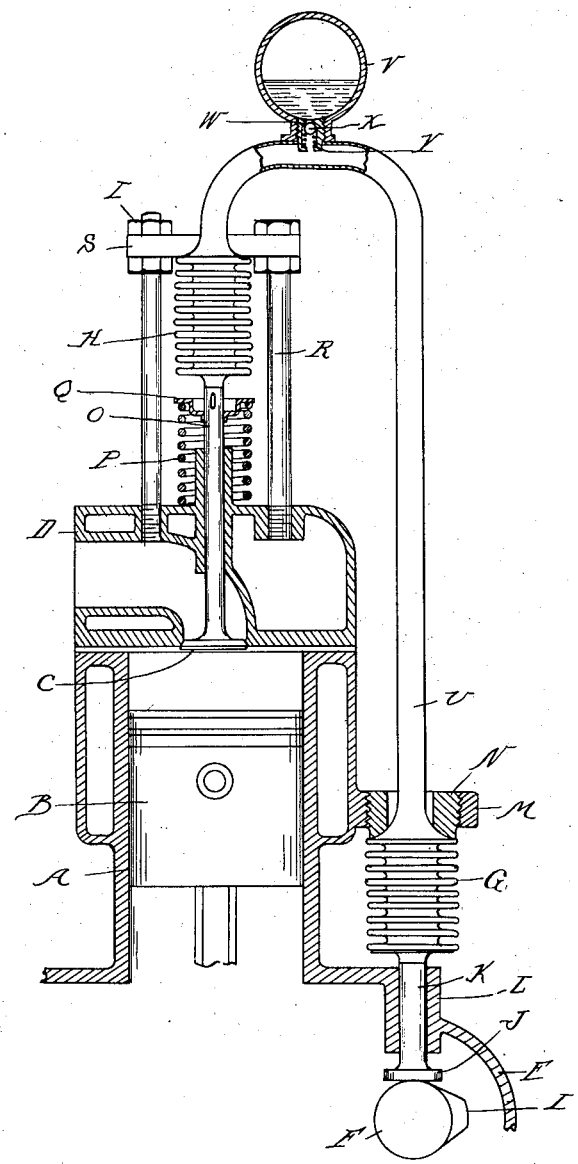
Inventor
Owen M. Nacker
By Whittemore Hulbert & Whittemore
Attorneys

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

VALVE-OPERATING MECHANISM.

1,265,103.  Specification of Letters Patent.  Patented May 7, 1918.

Application filed June 4, 1917. Serial No. 172,816.

*To all whom it may concern:*

Be it known that I, OWEN M. NACKER, a citizen of the United States of America, residing at Detroit, in the county of Wayne and State of Michigan, have invented certain new and useful Improvements in Valve-Operating Mechanism, of which the following is a specification, reference being had therein to the accompanying drawing.

The invention relates to valve-operating mechanisms and more particularly to mechanisms for the operation of puppet-valves. It is the object of the invention to obtain a simple construction applicable to any type of engine without reference to its specific design and one which eliminates noise and has other advantages as hereinafter set forth.

In the drawing there is represented a portion of an internal combustion engine showing my improved valve-operating mechanism applied thereto.

A is the engine cylinder containing the piston B, and C is a puppet-valve which, as shown, is arranged in the cylinder head D. E is the crank case, and F is the cam-shaft therein for operating the valves.

To avoid complexity of construction and the back-lash incident to any mechanical construction having a plurality of joints therein, I have dispensed with the usual rod and lever connection intermediate the cam-shaft and the puppet-valves and have substituted therefor a hydraulic transmission. This comprises essentially a pair of expansible chambers G H, preferably of the metallic bellows type, one being arranged to be operated by the cam-shaft F and the other in position to operate the valve C. As shown, the cam I on the cam-shaft F directly engages the head J of a rod K slidable in a bearing L in the crank-case, and the upper end of this rod K is attached to the bellows member G. M is a bracket member on the engine-casing for forming an abutment or anchorage for the opposite end of the bellows member G, and N is an adjustable member having a threaded engagement with the bracket M and bearing against the bellows, said member permitting of the requisite adjustment for original setting. The valve C is provided with the usual operating stem O passing outward through the head D and having the usual spring P engaging the collar Q on the stem for effecting the seating of the valve. The upper end of the stem O is attached to the bellows H, while the opposite end of said bellows is adjustably anchored by suitable means, such as the rods R, a cross-head S mounted thereon and the nuts T engaging threaded portions of the rods for adjustably securing said cross-head. U is a conduit connecting the bellows G and H and which may be arranged in any convenient position to avoid interference with other parts of the mechanism.

With the construction as thus far described, it will be apparent that where the conduit U and bellows members G and H are filled with a non-compressible fluid, such as water or oil, any movement of the rod K by the cam I which either compresses or expands the bellows G will transmit the pressure through the conduit U to the bellows H and effect the corresponding movement of this member, which in turn will actuate the stem O and valve C. By properly setting the device by adjustment of the members N and S all back-lash may be taken up, so that the valve will be lifted and returned to its seat by the rotation of the cam. Inasmuch, however, as all fluids available for such use are subject to expansion and contraction due to temperature changes, such a construction as described would be practically inoperative,—for any variation in temperature would require a change in adjustment.

To overcome this difficulty, I have made provision for an automatic adjustment that will take care of expansion and contraction of the fluid and maintain the transmission at all times operative. This, as shown, comprises an expansion chamber V, which is connected with the conduit U or some other part of the system and is capable of receiving any surplus volume of fluid due to expansion. The chamber V is of such a capacity as not only to receive the surplus fluid but to also contain a volume of air which will be compressed by the incoming fluid, or if desired may be of an initial pressure greater than atmospheric. The communication between the chamber V and the conduit U is restricted, as indicated at W, to such an extent that, while permitting the slow transfer of fluid from the conduit U to the chamber, any quick movement of the fluid in the conduit due to the compression or expansion of the bellows G will be transmitted to the bellows H with only negligible loss through the restricted connection W. Thus where the valve C is seated when the engine is idle any expansion or contraction of the fluid in the conduit U and bellows G and H will merely effect the transfer to or from the chamber B by the restricted passage W. On the other hand, if when the engine is idle, the valve C is in open position the pressure of the spring P will cause the gradual closing of the valve, forcing the fluid through the restricted passage W into the chamber V. As this would throw the mechanism out of time I have provided for instantaneous restoration on the initial movement of the engine, this comprising a check-valve X, which will permit the quick return of fluid from the chamber V to the conduit U. Thus in the initial movement of the cam-shaft, withdrawing the high point of the cam I from the rod K, the air pressure on the fluid within the chamber V will force open the valve X against the tension of a closing spring Y and permit sufficient fluid to enter the conduit U to expand the bellows G. It will be understood that the pressure of the air in the chamber V is insufficient to overcome the tension of the spring P, so that it will not operate to force the valve C from its seat, but, on the other hand, the pressure is sufficient to restore the fluid to the conduit U and to expand the bellows G, thereby taking up all back-lash.

There are many advantages resulting from the use of a valve-actuating mechanism such as described over the use of the usual mechanical constructions. One advantage is that the valves may be located wherever convenient, as the connecting conduit U may be extended in any direction without altering the operation. A further advantage is that after the original setting no further adjustment is required,—for the expansion chamber will automatically compensate for wear as well as for changes in volume of the fluid due to temperature, so that at all times back-lash is eliminated.

What I claim as my invention is:

1. In a valve-operating mechanism, the combination with a valve member and an actuating member therefor, of a fluid transmission therebetween comprising a longitudinally expansible chamber having one end in operative relation to one of said members, and an adjustable anchorage for the opposite end of said chamber.

2. In a valve-operating mechanism, the combination with a valve member and an actuating member therefor, of a fluid transmission therebetween comprising a pair of longitudinally expansible chambers respectively in operative connection with the valve and its operating member, anchoring means for the opposite ends of said chambers, a conduit connecting said chambers, and an expansion chamber having a restricted connection with said conduit.

3. In a valve-operating mechanism, the combination with the valve and an actuating member therefor, of a fluid transmission therebetween comprising a conduit, a pair of longitudinally expansible chambers connected to the opposite ends of said conduit, means for anchoring one end of each of said chambers with the opposite end thereof in operative relation with the valve or actuating member, adjustment means for originally setting, and automatic compensating means for maintaining the relation when once set.

4. In a valve-operating mechanism, the combination with a valve having an operating stem and a cam, of a fluid transmission therebetween comprising a fluid conduit, a pair of longitudinally expansible metallic bellows members at opposite ends thereof, means for anchoring one end of one of said members with its free end in operative connection with the stem of said valve, means for correspondingly anchoring one end of the other of said bellows members with its free end in operative relation with said cam, and an expansion chamber having a restricted connection with said conduit permitting of slow transfer of fluid therebetween, for the purpose described.

5. In a valve-operating mechanism, the combination with a valve and its actuating cam, of a fluid transmission therebetween comprising a pair of longitudinally expansible metallic bellows members, a fluid conduit connecting the same, means for anchoring one end of each of said bellows members with their free ends respectively in operative relation with the valve and the cam, an expansion chamber connected with said conduit, and means for restricting the communication between said conduit and expansion chamber permitting the quick return of fluid from the expansion chamber to the conduit.

6. In a valve operating mechanism, the combination with the valve and the operating member therefor, of a fluid transmission therebetween including a longitudinally expansible chamber having one end in contact with a coöperating movable member, and means for adjustably anchoring the opposite end of said expansible chamber.

In testimony whereof I affix my signature.

OWEN M. NACKER.